(No Model.) 2 Sheets—Sheet 1.
J. F. FRANKEY.
COPY HOLDER.
No. 421,260. Patented Feb. 11, 1890.
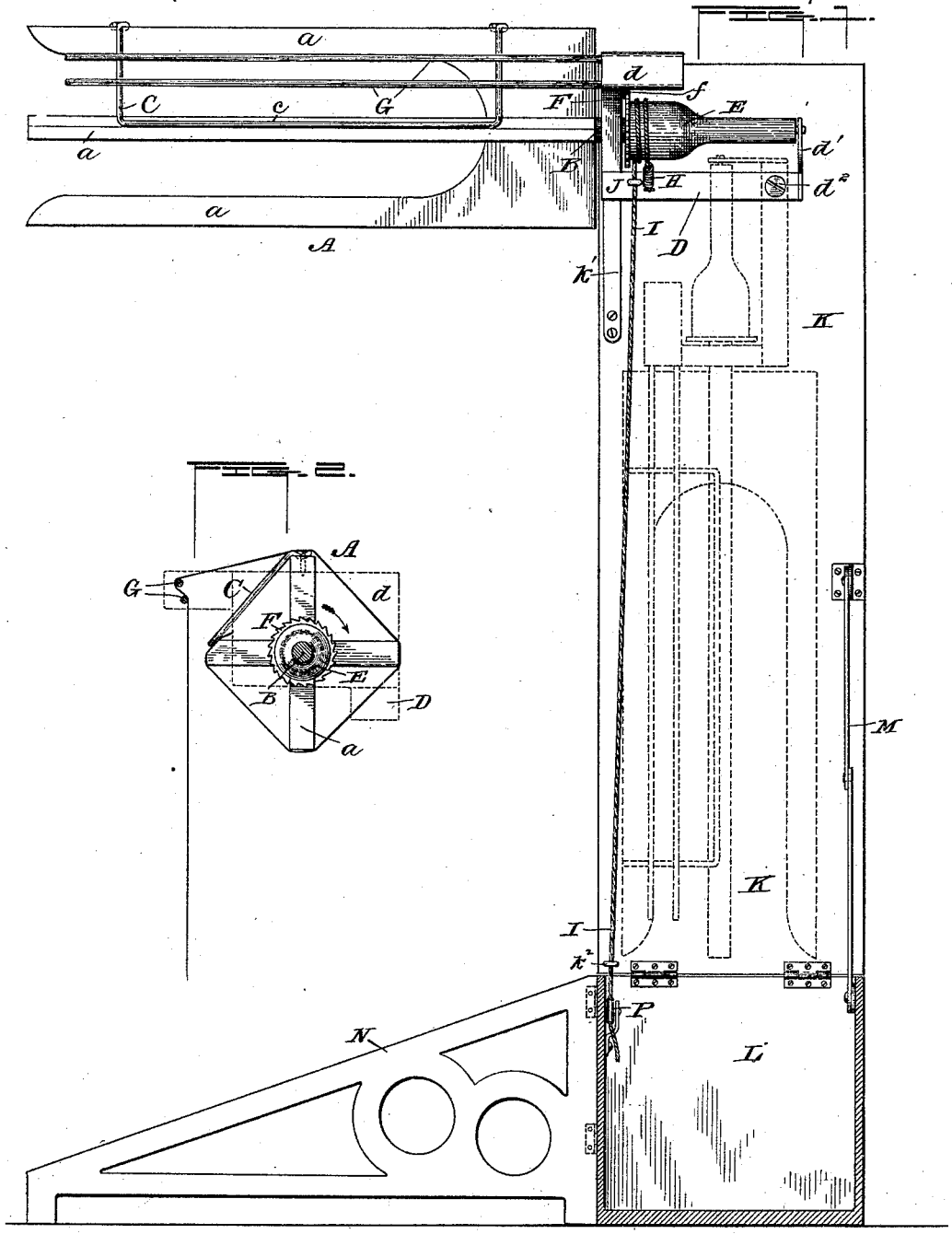
WITNESSES
INVENTOR
James F. Frankey
BY HIS ATTORNEY

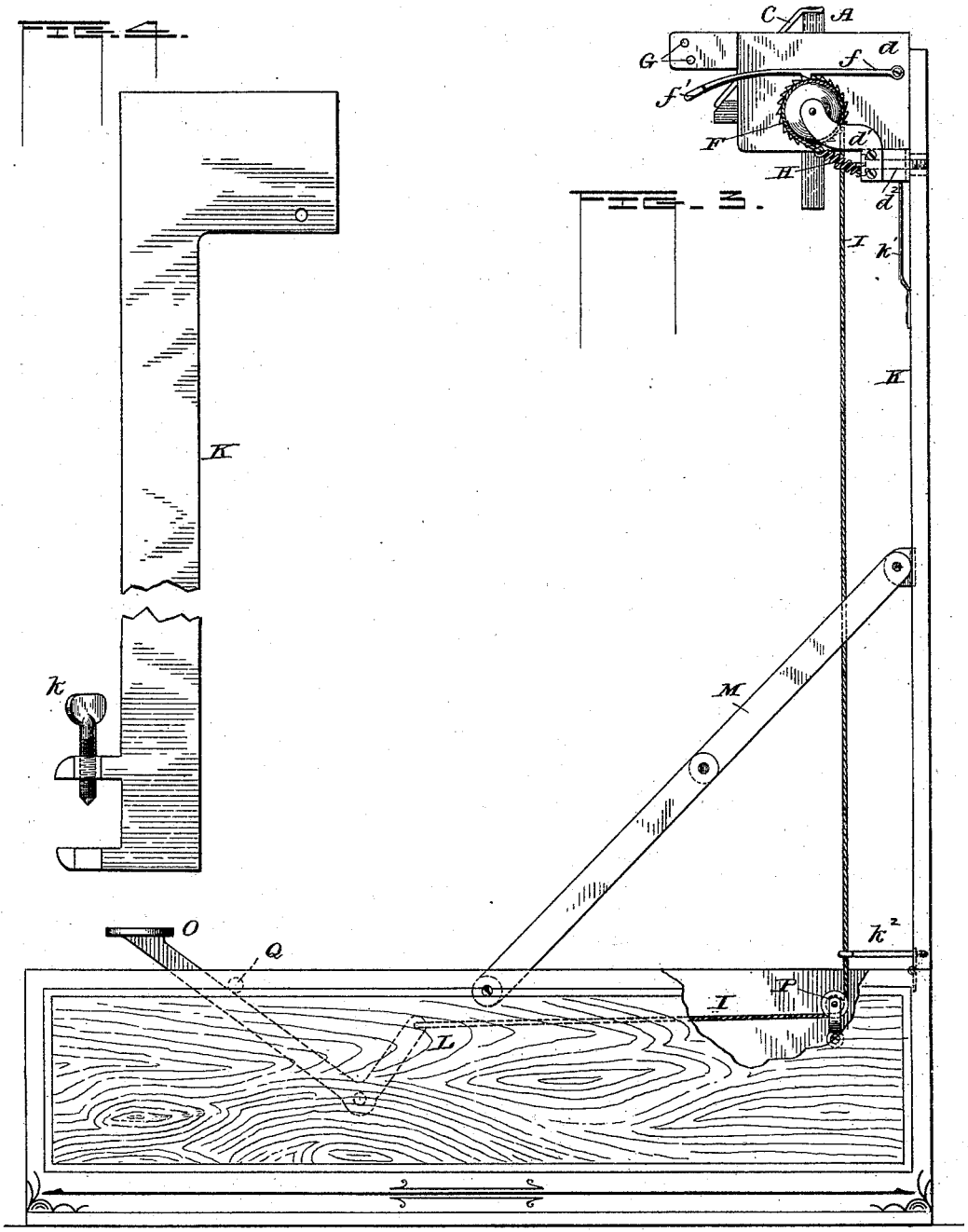

UNITED STATES PATENT OFFICE.

JAMES F. FRANKEY, OF DODGE CITY, KANSAS.

COPY-HOLDER.

SPECIFICATION forming part of Letters Patent No. 421,260, dated February 11, 1890.

Application filed November 23, 1889. Serial No. 331,280. (No model.)

*To all whom it may concern:*

Be it known that I, JAMES F. FRANKEY, a citizen of the United States, residing at Dodge City, in the county of Ford and State of Kansas, have invented certain new and useful Improvements in Copy-Holders; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to copy-holders for the use of printers, type-writers, copyists, and the like, who require some means for holding manuscript or other copy in a convenient position for writing.

My copy-holder consists, essentially, of a reel provided with a clip to hold the copy and a drum around which is wound a cord for imparting rotation to the reel. There is also a convenient line-guide through which the copy is drawn, and a standard for supporting these parts, and, if desired, a box is provided in which the reel may be received when not in use.

In the drawings, Figure 1 is a front elevation of my invention. Fig. 2 is an end view of the reel. Fig. 3 is a side elevation, and Fig. 4 shows a modified form of my standard.

The reel A is composed of several arms $a$, preferably four in number, extending parallel with each other and with the axis of rotation of the reel from one end of the shaft B, around which they are arranged at regular intervals. The arms are of a suitable length to receive copy of any of the usual widths. Secured to one of the arms is a clip consisting, preferably, of a piece of spring-wire C, bent into a long U with squared corners, and arranged with its straight middle portion $c$ pressing upon the edge of the arm next to that to which its ends are fastened. The edge of the arm upon which it presses may be properly chamfered, as shown, to give the wire a good bearing.

The shaft B is journaled in head-blocks $d$ $d'$, secured to a board D. Between the head-blocks the shaft is provided with a drum E and ratchet-wheel F. A detent-pawl $f$ is fastened to the head-block $d$ and engages with the ratchet-wheel, being provided with a forwardly-projecting handle $f'$, by means of which it can be raised from the ratchet-wheel when necessary. The teeth in the ratchet are so arranged that the reel can be turned in one direction only. Firmly secured to the head-block $d$ are two parallel rods or wires, one above the other, which project along in front of the reel and parallel therewith. The copy is slipped between the rods so as to lie in front of the upper one and behind the lower one, which thus serves as a line-guide. The rods are preferably so arranged that the paper shall hang vertically from them, clear of the reel.

Attached to the base D, adjacent to the drum E, is one end of a spiral or other spring H. A cord I is fastened to the other end of the spring and is given one or more turns around the drum, leading thence through a guide J in the base, and thence to any convenient point of operation. Upon pulling on the cord the drum and reel will be rotated and the spring put under tension. When the strain on the cord is relaxed, the turns around the drum are loosened and the contraction of the spring draws the cord back to its original position. Backward rotation of the drum is prevented by the detent-pawl $f$. In this way the copy can be fed forward more or less as desired according to the extent of the pull upon the cord.

The reel may be secured upon any suitable standard K, and when intended for compositors the standard may be such as I have shown in Fig. 4, provided with a set-screw $k$, by which it can be clamped to the type-case. The base D is pivoted to the standard by a bolt $d^2$, and is held in its working position by a spring-stop $k'$, fastened to the standard and adapted to support the base in its raised position by engaging with its lower edge. When the reel is to be put away, the spring-stop is pressed back and the base D with the reel is allowed to swing down in front of the standard, as shown in dotted lines in Fig. 1.

When intended for use upon a copyist's desk or a type-writer's stand, I prefer the arrangement shown in Figs. 1 and 3. The standard here forms the lid of a box L, to which it is hinged at one end. The box is of a proper size to receive the reel when the lid is shut down. A hinged brace M supports the lid when open, and a foot N may be hinged to the side of the box and adapted to be opened at right angles thereto to prevent the weight of the reel when in working position from upsetting the box.

A convenient means for operating the cord I consists of a lever O, fulcrumed inside the box L near the front and connected with the cord, which runs through a guide $k^2$ on the standard and under a pulley P at the rear of the box. A stop Q may limit the upward movement of the lever, while it is so arranged as to give a sufficient range of downward movement to exert a maximum pull on the cord. This lever may also be used with the standard shown in Fig. 4, if desired.

The fact that the reel is supported at one end only enables the copy to be readily slipped off after it has been wound upon the arms $a$.

Having thus described my invention, what I claim, and desire to secure by Letters Patent, is—

1. A copy-holder consisting of a reel provided with a clip and journaled in suitable bearings, a drum on the shaft of the reel, a cord wound around the drum, and a spring, to which one end of the cord is fastened, substantially as described.

2. A copy-holder consisting of a reel provided with a spring-clip and journaled in suitable bearings, a drum, and a ratchet-wheel on the shaft of the reel, a cord wound around the drum, a spring to which one end of the cord is fastened, and a detent-pawl engaging with the ratchet-wheel, substantially as described.

3. A reel for a copy-holder, consisting of a shaft provided with several arms $a$, arranged at regular intervals around it and extending parallel with each other and with the axis of the shaft, and a spring-clip C, attached to one of said arms, substantially as described.

4. The combination, with the reel A, journaled in the head-block $d$, of the two parallel rods G, firmly secured to the head-block and projecting along in front of the reel and parallel therewith, substantially as described.

5. The combination, with the standard K, of a reel pivoted thereto, so as to be adapted to swing down in line with the standard when not in use, substantially as described.

6. The combination, with the standard K, of the base D, pivoted thereto and provided with head-blocks $d$ $d'$, and the reel A, mounted to rotate in said head-blocks, substantially as described.

7. The combination, with the standard K, of the base D, pivoted thereto and carrying the rotatable reel A, and the spring-stop $k'$, attached to the standard and adapted to engage with the base D and hold the reel in working position, substantially as described.

8. The combination, with the box L, of the standard K, hinged thereto and serving as a lid therefor, the reel A, carried on the standard, and the brace M, substantially as described.

9. The combination, with the box L, of the standard K, hinged thereto and serving as a lid therefor, the reel A, pivotally mounted on the standard, the brace M, and the foot N, hinged to the side of the box, substantially as described.

10. The combination, with the box L, having hinged thereto the standard K, having the reel A mounted thereon, and provided with a cord to operate it, of a lever O for actuating the cord, substantially as described.

11. The combination, with the box L, having the lid K, carrying the reel A, pivoted thereto, of the cord I for operating the reel, the lever O, fulcrumed in the box and connected with the cord, and the pulley P, under which the cord passes, the reel being received within the box with the lever when the lid is closed, substantially as described.

In testimony whereof I affix my signature in presence of two witnesses.

JAMES F. FRANKEY.

Witnesses:
BERTHA S. MCGARRY,
H. MCGARRY.